(12) United States Patent
Fino et al.

(10) Patent No.: US 9,719,797 B2
(45) Date of Patent: Aug. 1, 2017

(54) VOICE AND TOUCH USER INTERFACE

(71) Applicant: Apple Inc., Cupertino, CA (US)

(72) Inventors: Jorge S. Fino, San Jose, CA (US); Imran Chaudhri, San Francisco, CA (US); Scott M. Herz, San Jose, CA (US); Justin E. Santamaria, San Francisco, CA (US); Donald W. Pitschel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/209,815

(22) Filed: Mar. 13, 2014

(65) Prior Publication Data

US 2014/0278072 A1    Sep. 18, 2014

Related U.S. Application Data

(60) Provisional application No. 61/793,924, filed on Mar. 15, 2013.

(51) Int. Cl.
*G01C 21/12* (2006.01)
*G01C 21/36* (2006.01)

(52) U.S. Cl.
CPC ......... *G01C 21/3697* (2013.01); *G01C 21/36* (2013.01); *G01C 21/362* (2013.01)

(58) Field of Classification Search
CPC .......... G06Q 30/02; G06Q 10/063116; G06Q 10/06314; G06Q 10/109; G06Q 10/1093;
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| DE | 10237725 A1 | 2/2004 | |
| GB | 0820447 | * 12/2008 | ............. H04W 4/02 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Redhwan K Mawari
(74) *Attorney, Agent, or Firm* — Morrison and Foerster LLP

(57) ABSTRACT

Various examples are directed to an electronic device capable of touch input through a touch-sensitive surface and/or voice input through a microphone. In some examples, the electronic device may be used in an automobile. For example, some or all of the electronic device may be mounted in a dashboard for use while driving. The electronic device may provide informational content, entertainment content, navigation, and communication features in such a manner that user interaction may be minimized, thus providing a safe driving experience. This can be accomplished by performing tasks and presenting content automatically, without the need for user input, and by allowing user input through voice controls, touch screen controls, and/or physical controls mounted on the dashboard or steering wheel, among other possibilities.

37 Claims, 18 Drawing Sheets

(58) Field of Classification Search
CPC ........... G06Q 10/1095; G06Q 30/0603; G06Q 30/0621; G06Q 30/06; G06Q 50/26; H04W 4/02; H04W 4/027; A63B 2022/025; A63B 2071/06
USPC .................................................. 701/533, 465
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,139,722 | B2* | 11/2006 | Perrella ........... G06Q 10/063116 701/533 |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,862,995 | B1* | 10/2014 | Kuhne ............... G06F 17/30817 715/723 |
| 2004/0226775 | A1* | 11/2004 | Takatama ............... G06Q 30/06 186/53 |
| 2006/0197753 | A1 | 9/2006 | Hotelling |
| 2009/0125228 | A1* | 5/2009 | Dicke ................. G01C 21/3438 701/533 |
| 2010/0131844 | A1* | 5/2010 | Wohlert ............ G06F 17/30029 715/716 |
| 2010/0145694 | A1* | 6/2010 | Ju ........................ G10L 15/1815 704/235 |
| 2010/0153111 | A1* | 6/2010 | Hirai ................... B60R 16/0373 704/251 |
| 2010/0204915 | A1 | 8/2010 | Kuenzner |
| 2011/0035223 | A1* | 2/2011 | Schiller ................. G10L 19/167 704/260 |
| 2012/0046020 | A1* | 2/2012 | Tomasini ............ H04M 1/6075 455/418 |
| 2012/0110449 | A1* | 5/2012 | Frey .................... G06Q 30/0621 715/708 |
| 2012/0110616 | A1* | 5/2012 | Kilar ................... H04N 7/17318 725/32 |
| 2012/0179833 | A1* | 7/2012 | Kenrick ......... H04N 21/234309 709/231 |
| 2012/0295764 | A1* | 11/2012 | Brammer ........... A63B 24/0087 482/9 |
| 2013/0200991 | A1 | 8/2013 | Ricci et al. |
| 2014/0278072 | A1* | 9/2014 | Fino ................... G01C 21/3697 701/465 |
| 2016/0248897 | A1 | 8/2016 | Walsh et al. |

FOREIGN PATENT DOCUMENTS

| | | | | |
|---|---|---|---|---|
| GB | WO 2010052113 | A1 * | 5/2010 | ............ H04W 4/02 |
| JP | 2000-163031 | A | 6/2000 | |
| JP | 2002-342033 | A | 11/2002 | |
| WO | WO-2014/107513 | A2 | 7/2014 | |
| WO | WO-2014/107513 | A3 | 7/2014 | |
| WO | WO-2016/137900 | A1 | 9/2016 | |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
U.S. Appl. No. 12/207,316, filed Sep. 9, 2008, by W. Bull et al.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
International Search Report mailed May 9, 2016, for PCT Application No. PCT/US2016/018974, filed Feb. 22, 2016, six pages.

* cited by examiner

VOICE AND TOUCH USER INTERFACE

FIELD OF THE DISCLOSURE

This relates generally to a voice and touch screen user interface of an electronic device.

BACKGROUND OF THE DISCLOSURE

Many automobiles provide dashboard computers with navigation and content applications. However, most dashboard computer solutions rely on unintuitive user interfaces that are difficult to operate in a hands-free and safe manner while driving.

SUMMARY OF THE DISCLOSURE

Various examples are directed to an electronic device capable of touch input through a touch-sensitive surface and/or voice input through a microphone. In some examples, the electronic device may be used in an automobile. For example, some or all of the electronic device may be mounted in a dashboard for use while driving. The electronic device may provide informational content, entertainment content, navigation, and communication features in such a manner that user interaction may be minimized, thus providing a safe driving experience. This can be accomplished by performing tasks and presenting content automatically, without the need for user input, and by allowing user input through voice controls, touch screen controls, and/or physical controls mounted on the dashboard or steering wheel, among other possibilities.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various examples are directed to an electronic device capable of touch input through a touch-sensitive surface and/or voice input through a microphone. In some examples, the electronic device may be used in an automobile. For example, some or all of the electronic device may be mounted in a dashboard for use while driving. The electronic device may provide informational content, entertainment content, navigation, and communication features in such a manner that user interaction may be minimized, thus providing a safe driving experience. This can be accomplished by performing tasks and presenting content automatically, without the need for user input, and by allowing user input through voice controls, touch screen controls, and/or physical controls mounted on the dashboard or steering wheel, among other possibilities.

Although examples disclosed herein may be described and illustrated herein primarily in terms of an electronic device in an automobile, it should be understood that the examples are not so limited, but are additionally applicable to user interfaces of electronic devices in general.

Figure 1:
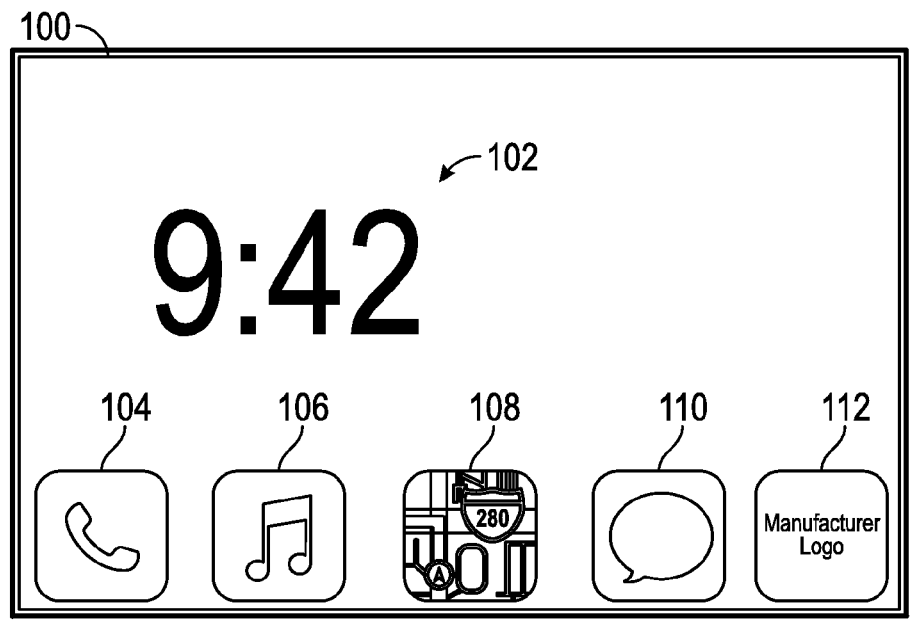
FIG. 1 illustrates an exemplary home screen according to examples of the disclosure.

FIG. 1 illustrates an exemplary home screen user interface 100 according to examples of the disclosure. The home screen 100 may include the current time 102. Additionally, the home screen may include one or more icons 104-112, each corresponding to an application of the electronic device. If input is detected on an icon, the corresponding application may be executed. A phone icon 104 may correspond to a phone application. A music icon 106 may correspond to a music application. A map icon 108 may correspond to a map or navigation application. A message icon 110 may correspond to a message application. Additionally, one or more icons 112 may correspond to applications and/or software provided by a manufacturer of the automobile.

Applications and/or tasks may be automatically invoked based on sensors of the electronic device or information provided to the electronic device by other devices, such as systems of the automobile. For example, a task may be automatically invoked when the automobile is started. In another example, a task may be automatically invoked based on a current location as provided by a sensor such as a Global Positioning System (GPS) sensor.

In some examples, a current location can be determined based on at least one of GPS, correlations from known access points (such as cell-ID, WiFi ID/network ID), radio tower triangulation, and cell tower triangulation, among other possibilities.

Figure 2:
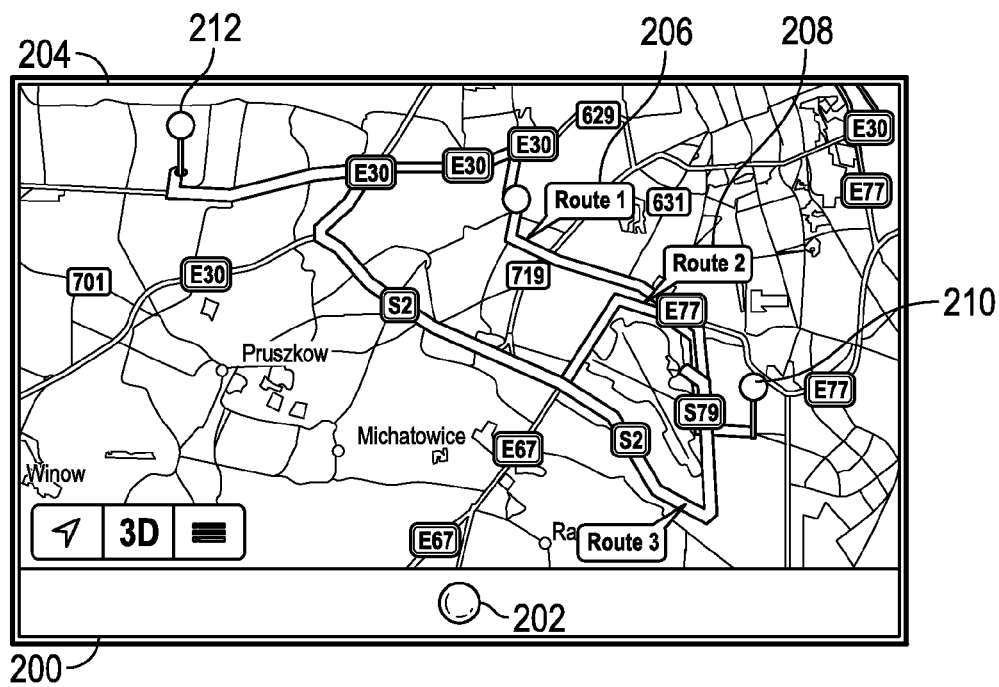
FIG. 2 illustrates an exemplary route user interface according to examples of the disclosure.

In some examples, a home button, such as the home button 202 illustrated in FIG. 2, may be displayed in a user interface 200 and user input on the home button may cause the electronic device to display the home screen. In some examples, one or more physical controls on the electronic device or on a dashboard or steering wheel may cause the electronic device to display the home screen. In some cases, detection of user input on the home button may not cause the home screen to be displayed, but instead may cause a dock to be displayed at the button of the screen, the dock displaying one or more application or task icons. The dock may be displayed as an overlay to a user interface that is currently being displayed.

FIG. 2 illustrates an exemplary route user interface 204 according to examples of the disclosure. When an automobile is started, a route user interface 204 may be automatically invoked. One or more routes 206 and 208 to potential destinations 210 and 212 may be displayed on a map, along with traffic information. Input such as swipe gestures or voice commands may be accepted to select from among the destinations.

The electronic device may monitor location information and learn frequently-visited destinations to display. One or more frequent destinations may be associated with times of the day. For example, if a user uses the device in the morning, frequent destinations associated with the morning (such as a workplace) may be displayed, whereas if the user uses the device in the evening, frequent destinations associated with the evening (such as a home or a restaurant) may be displayed. In some examples, the device may review destinations associated with upcoming calendar appointments and display those destinations.

Figure 3:
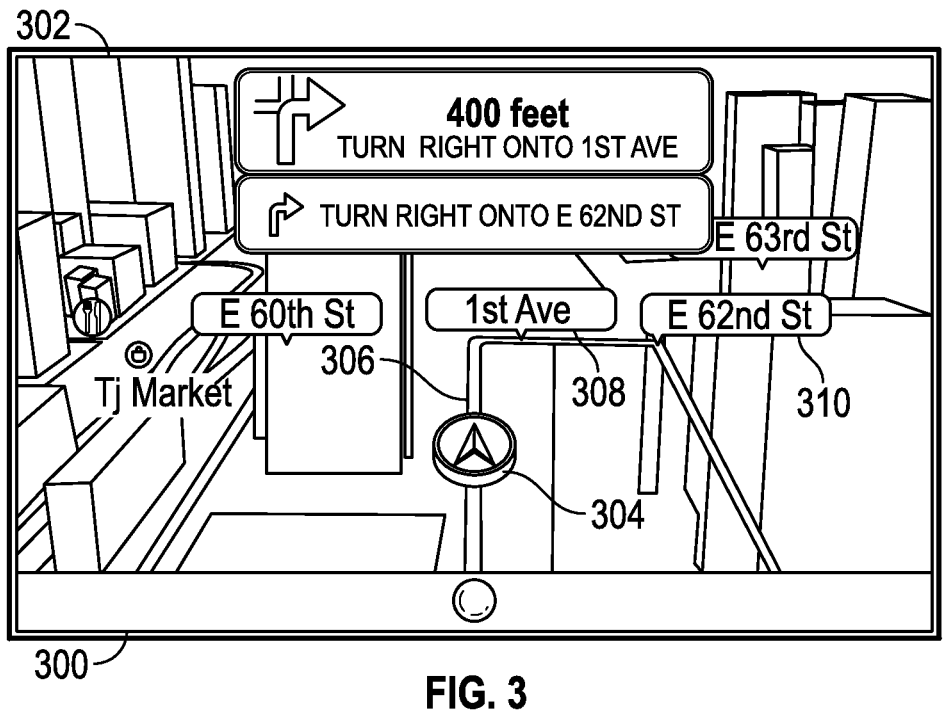
FIG. 3 illustrates an exemplary navigation user interface according to examples of the disclosure.

Based on the selection of a destination and/or information indicating that the automobile has begun to move, a navigation mode may be invoked, as illustrated in FIG. 3. A user interface 302 of a navigation mode may include an indicator of a current location 304, a line indicating the current route 306, and one or more geographical features, such as street label 310. Additionally, the user interface may include an estimated arrival time and an estimated remaining duration.

Figure 4:
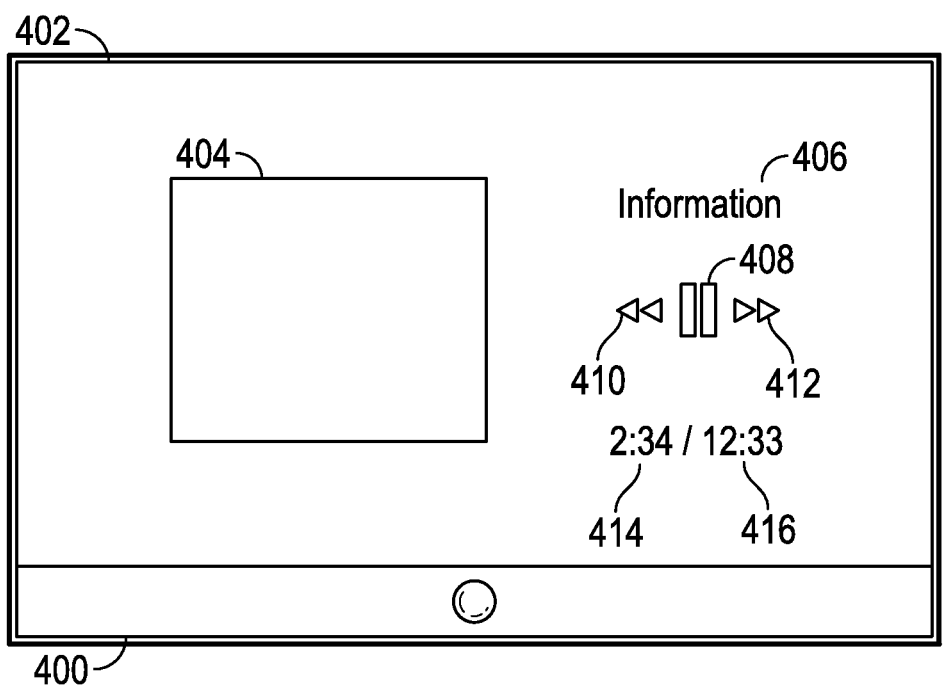
FIG. 4 illustrates an exemplary audio program user interface according to examples of the disclosure.

To provide a mostly hands-free experience for the user, audio content can be automatically arranged into an audio program to be played for the user during the duration of a trip. FIG. 4 illustrates an audio program user interface 402 according to examples of the disclosure. Graphic content 404 may be displayed. The graphic content 404 may be associated with an audio clip currently playing. For example, if the audio clip is a song, then the graphic content 404 may be album art associated with the song. If the audio clip is a podcast, then the graphic content 404 may be a logo associated with the podcast. Additionally, textual information 406 associated with the audio clip may be displayed. A total duration 416 of the clip may be displayed, along with the current temporal position 414 of the audio clip. Audio controls may be displayed, including pause 408, skip forward 412, and skip backward 410. Input may be accepted to activate any of these controls.

Audio clips to be arranged into an audio program may be selected tailored to a user's preferences. For example, songs that are played frequently may be selected for the audio program. New episodes of a subscribed podcast may be selected for the audio program. Other audio content such as audio books may be selected. Additionally, audio clips may be generated for the audio program. For example, textual news articles may be selected and audio of the text being read may be generated (through a text-to-speech algorithm, for example) and selected for the audio program. In some examples, a user's preferences may be learned based on user behavior, as in the case where songs that are played frequently may be selected for the audio program. In some cases, user's preferences may be set more explicitly by the user in a user interface that presents choices to the user.

In some examples, audio clips may be selected based on an estimated duration of the route selected for travel. For example, clips may be selected such that the total duration of the audio program is within some threshold time (e.g., one minute) of the total duration of the route. Additionally, short clips of music from a user's music collection may be interspersed between longer audio clips to simulate "bumper" music between segments of a radio show. Such clips can also be used when automatically arranging the audio program to bring the duration of the program closer to the duration of the route. In one possible algorithm, several audio clips of five minutes or more can be selected to bring the total duration of the program within five minutes of the total route duration, and then several one minute music excerpts can be selected to bring the total duration of the program within one minute of the total route duration.

In some examples, a user may pause an audio clip, or skip forward or backward within the audio clip or to another audio clip in the audio program. In such a case, the audio program may be dynamically re-arranged so that the remaining duration of the audio program is within some threshold time (e.g., one minute) of the remaining duration of the route. This may include adding or removing audio clips from the program, changing the order of audio clips within the program, and/or editing audio clips to make them longer or shorter, among other possibilities.

Figure 5:
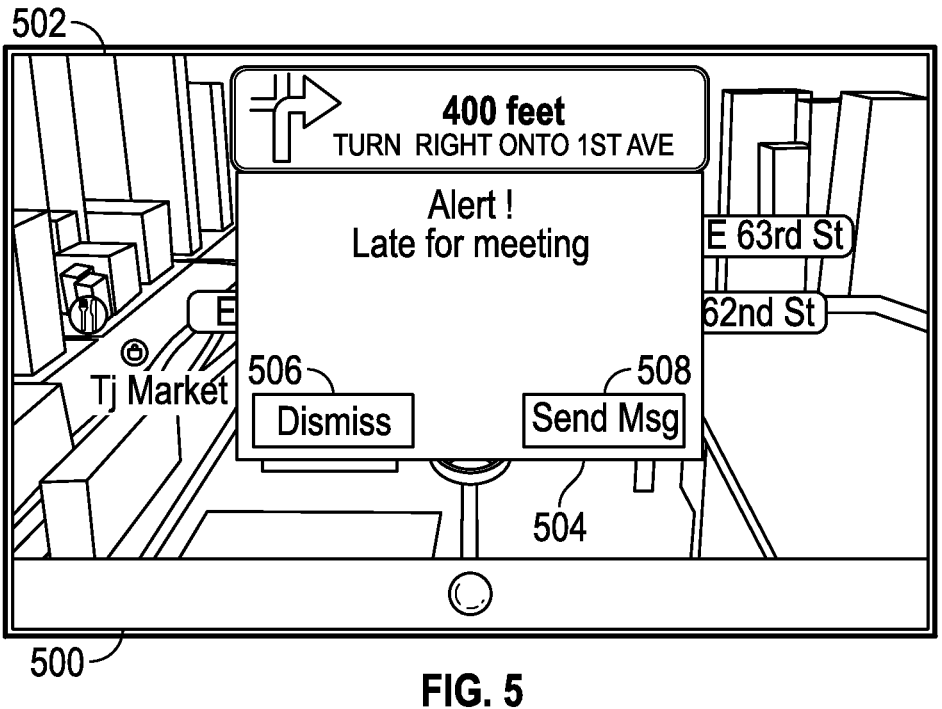
FIG. 5 illustrates an exemplary alert user interface according to examples of the disclosure.

In some examples, the current task, such as an audio program or route navigation, may be interrupted by one or more alerts. For example, FIG. 5 illustrates an alert 504 that the user will be late for a meeting displayed over route navigation 502. In some examples, the alert may simply be displayed without any audio indication of the alert, and the audio of the current task may continue uninterrupted. The alert may be displayed with one or more buttons such as a dismiss button 506 and a send message button 508. The dismiss button 506 may allow the alert to be dismissed, and the user interface can continue to display the current task. The send message button 508 may automatically send a message or email to other meeting attendees, informing them that the user will be late for the meeting.

The electronic device can monitor traffic conditions and how those conditions might affect an arrival time of the current route. Additionally, the electronic device can use information of a calendar to determine whether the user will arrive in time for a meeting with location information scheduled on the calendar. Based on a determination that the user will not arrive in time, the electronic device can display an alert that the user will be late for the meeting, as described above with respect to FIG. 5.

Figure 6:
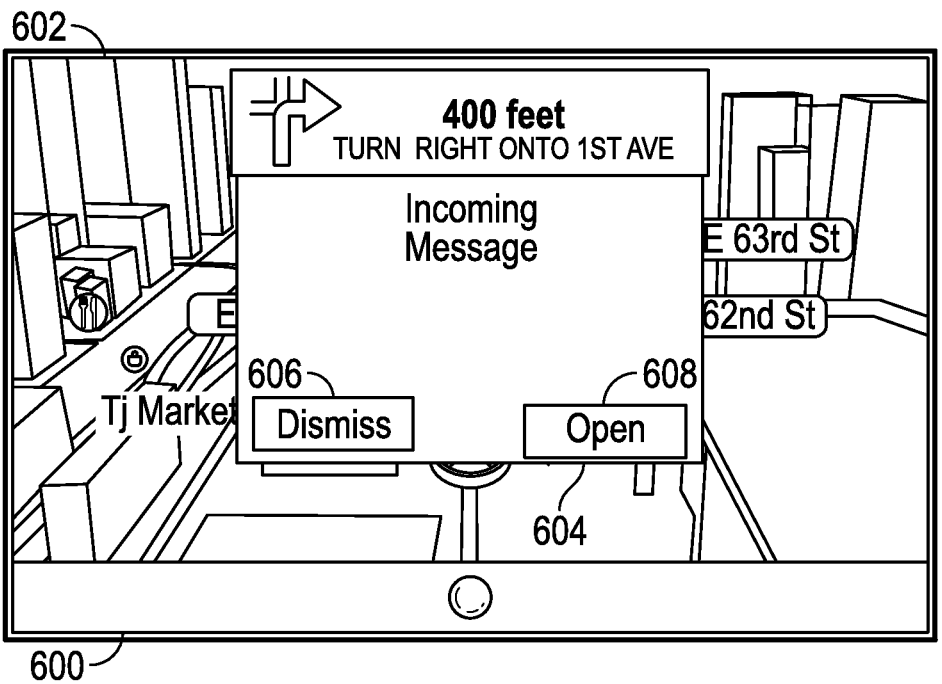
FIG. 6 illustrates an exemplary alert user interface according to examples of the disclosure.

FIG. 6 illustrates an alert 604 that the user has received an incoming message. As discussed above, the alert 604 may simply be displayed without any audio indication of the alert, and the audio of the current task (such as an audio program or route navigation) may continue uninterrupted. The alert may include a dismiss button 606 and an open message button 608. User input selecting the open message button 608 can cause the audio of the current task to be interrupted, and audio of the message can be played. A user may seek or skip through any audio using touch controls or physical controls.

After the message has been played, a voice assistant may ask the user if the message should be reread or if the user would like to respond. The user may control the voice assistant with voice commands, including natural language voice commands. In some examples, a microphone icon or some other icon may be displayed on the screen whenever voice input may be accepted. The user may use voice commands to dictate a response message or to dismiss the incoming message.

Figure 7:
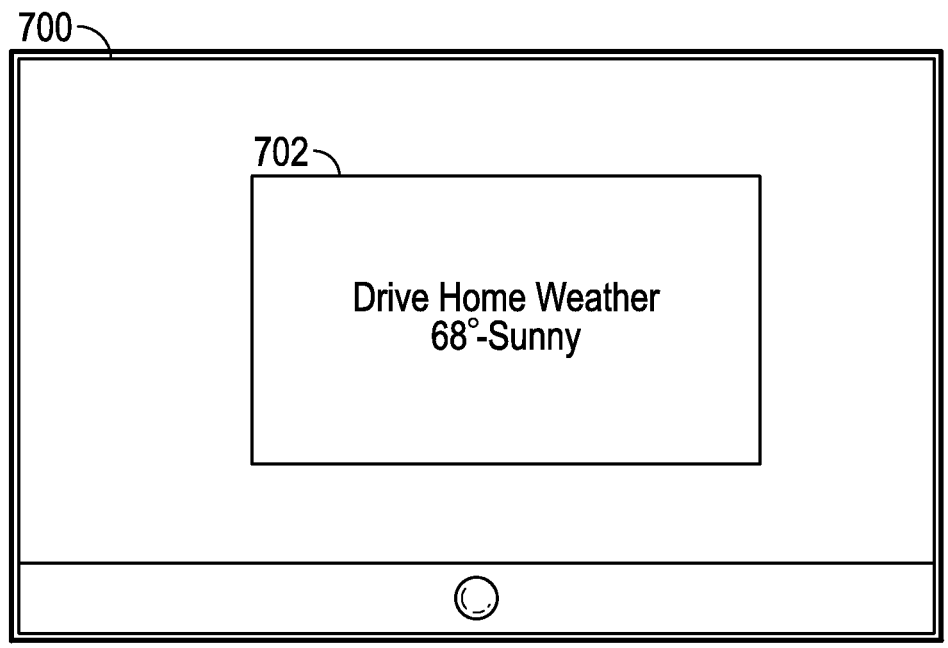
FIG. 7 illustrates an exemplary destination screen user interface according to examples of the disclosure.

The electronic device may determine that a user has arrived at the destination based on location information, which can be obtained from a GPS sensor, among other possibilities. Additionally, the electronic device may determine that a user has arrived at a destination based on other information, such as information indicating that the automobile has stopped or the engine has been shut off. Information relevant to the user may be displayed in a destination screen user interface 700, as illustrated in FIG. 7. For example, the electronic device may display weather information 702 about the destination or about an upcoming trip, such as the drive home later in the day. Calendar reminders about upcoming appointments may also be displayed. In another example, if the user has arrived late, information regarding how the user's calendar schedule has changed may be displayed, especially if appointments or meeting times have been changed.

Figure 8:
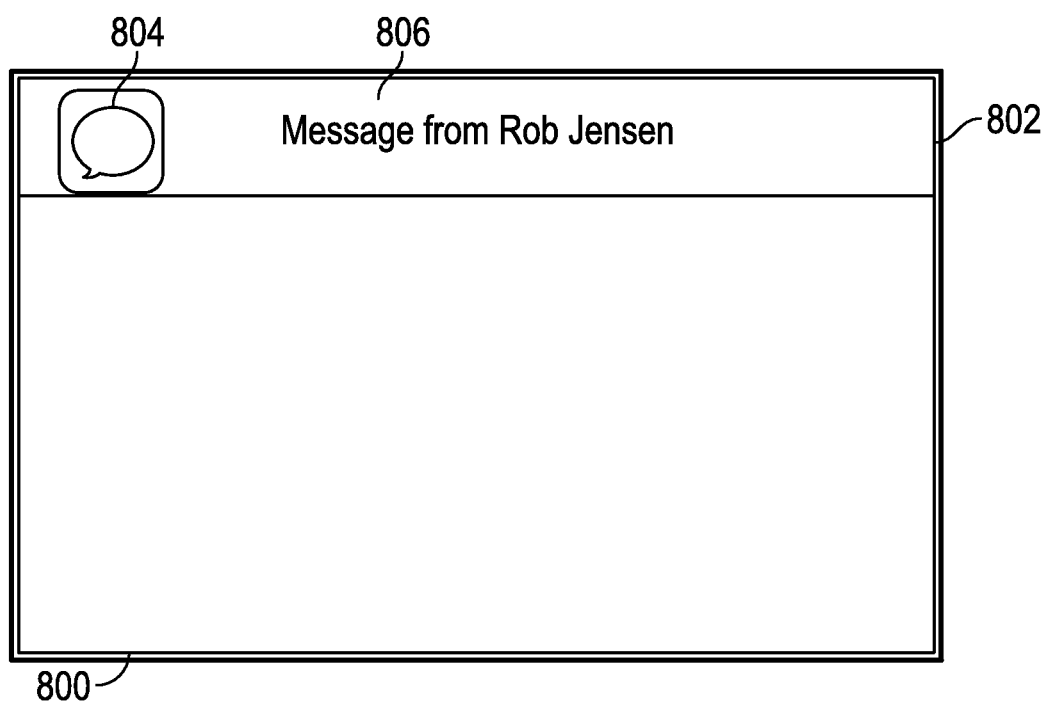
FIG. 8 illustrates an exemplary banner alert user interface according to examples of the disclosure.

FIG. 8 illustrates a banner alert 802 of an incoming message according to examples of the disclosure. The electronic device may include software provided by a manufacturer of the automobile. Such software may not be carefully integrated with the content and communications applications disclosed herein. Accordingly, banner alerts such as those illustrated in FIG. 8 may be displayed over a user interface of automobile manufacturer software to provide for a more unified user experience. The banner alert 802 may display alert text 806 and an icon 804 or otherwise indicate graphically that the alert originated from one of the content and communications applications disclosed herein, and not from the manufacturer software, and thus that interacting with the banner would initiate a transaction with a communications application, for example, and not with the manufacturer software.

Figure 9:
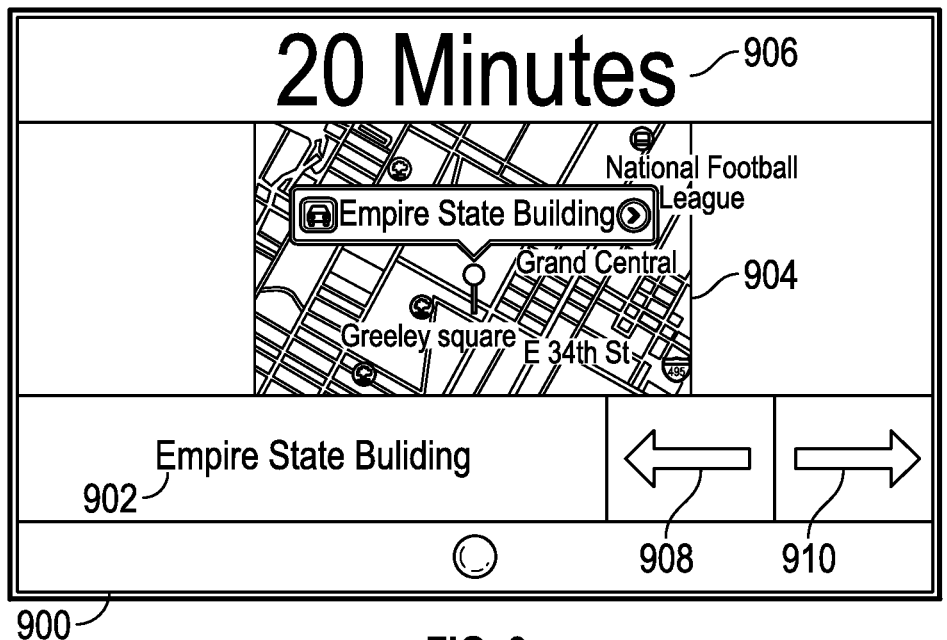
FIG. 9 illustrates an exemplary search results user interface according to examples of the disclosure.

In some examples, a voice search task may be invoked to search for possible destinations. FIG. 9 illustrates an exemplary search results user interface 900 according to examples of the disclosure. The name 902 of the search result and a map 904 showing the location of the search result may be displayed. An estimated route duration 906 from a current location to the search result location may be calculated and displayed. If there is more than one search result, navigation arrows 908 and 910 may be displayed to cycle through the search results. Selecting the right arrow 910 may cause a next search result to be displayed in place of the current result, and selecting the left arrow 908 may cause a previous search result to be displayed in place of the current result. In some examples, swipe gestures or voice commands may also be used to display one or more additional search results. A destination may be selected by the user, and a navigation task may be invoked with the selected destination as the destination of the navigation task.

Figure 10:
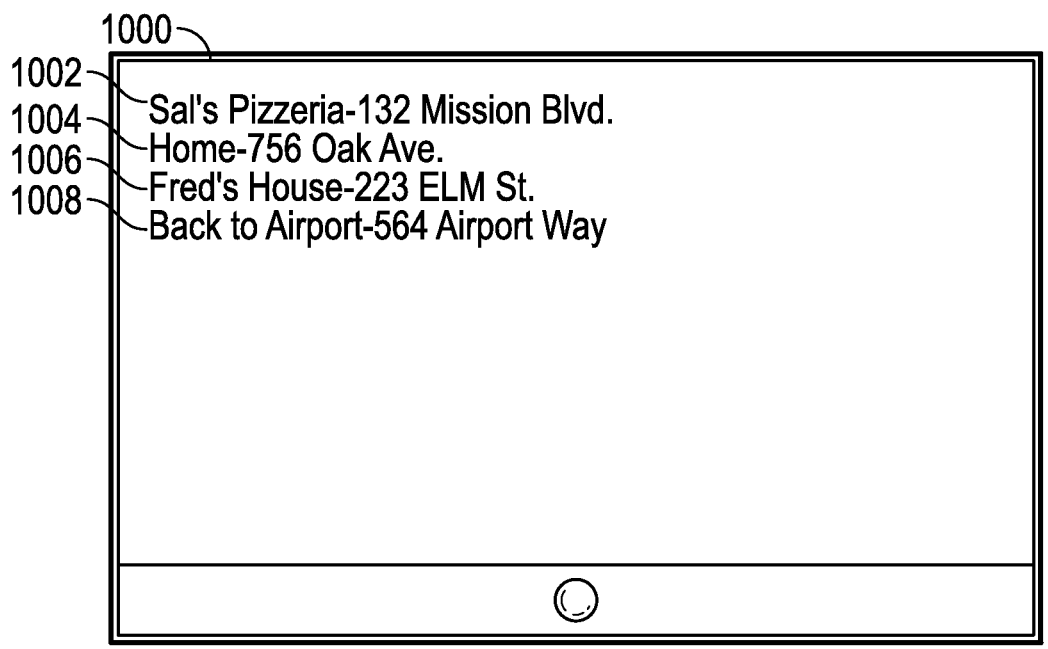
FIG. 10 illustrates an exemplary recent location list user interface according to examples of the disclosure.

In some examples, a destination may be selected from a recent location list 1000 as illustrated in FIG. 10. The recent location list 1000 may include locations 1002-1008 obtained from recent tasks performed on the electronic device or on another electronic device by the same user. For example, the recent location list 1000 may include a location of a restaurant that the user recently searched for in a web browser on a connected mobile device. In another example, the recent location list 1000 may include an address of a contact that the user recently emailed or messaged. In another example, if the user recently navigated from a source location to a destination location, then the source location may be included in the recent location list 1000.

One or more applications of the electronic device may be presented in a limited information mode based on a determination that the user is in an automobile. For example, if the electronic device can be disconnected from the automobile, the applications may function in a full information mode, whereas once the electronic device is connected to the automobile, applications function in a limited information mode. An application functioning in a limited information mode may present only information that would be relevant in an automobile to reduce possible distractions while driving. For example, a messages application may display all received messages in a full information mode. In a limited information mode, the messages application may only display messages received while in the limited information mode. Additionally, a contacts application in a full information mode may display information about a contact such as a website, a phone number, a physical address, and an email address. In a limited information mode, the contacts application may only display the phone number and the physical address. In some examples, the phone number may not be displayed at all, and instead only a button for calling the contact may be displayed.

In addition, on determining that the user is in an automobile and/or the automobile is in motion, the system may operate in a limited input mode. Alternatively, in some examples, this limited input mode may be the only available input mode. In such a mode, a variety of limitations can be placed on a user's ability to provide input to the system in the interest of, for example, ease of use, limitation of driver distraction or for simplification of the interface, among others. For example, a search field such as that used by a navigation application may only allow text entry in a dictation mode. Appropriate graphical, animation, and/or auditory cues may indicate to a user that such a search field is only available for text entry in a dictation mode. Thus, for example, if a user activates a feature of the system that allows the user to enter an arbitrary search string for the navigation application to interpret and, based on that interpretation, return a destination list, a microphone icon, a waveform icon, or other indication may be displayed to alert the user that while text input is expected, such input may only be provided by dictation. In another instance, if a user is alerted to the receipt of a message such as a text message, email message, Apple Messages message, and/or a pushed notification, the system may limit the user's ability to respond to a voice only mode, or to a selection between a fixed set of options provided on the screen.

Figure 11:
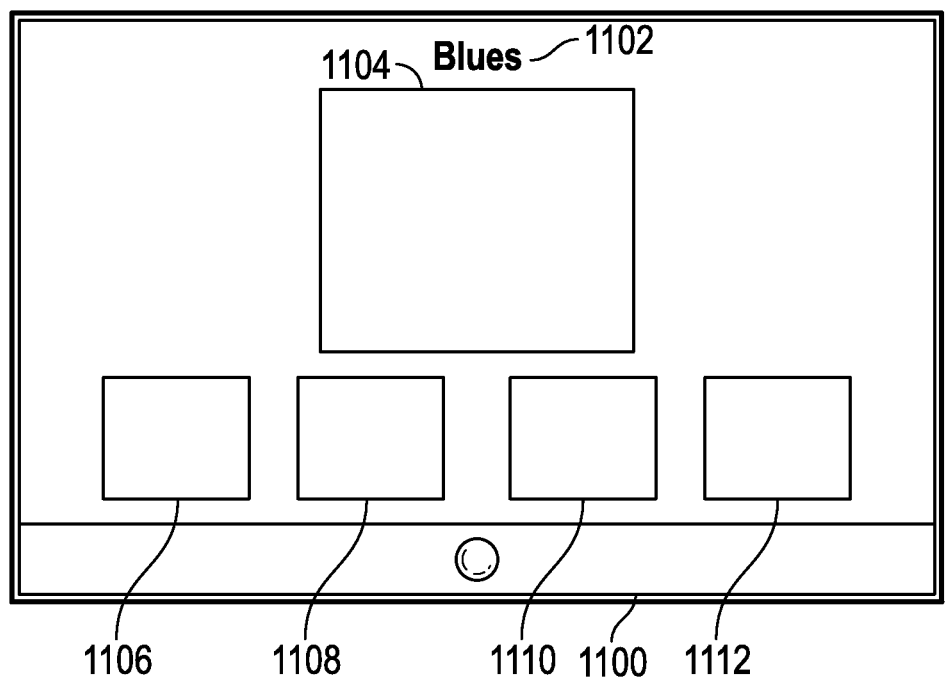
FIG. 11 illustrates an exemplary seek mode user interface according to examples of the disclosure.
Figure 12:
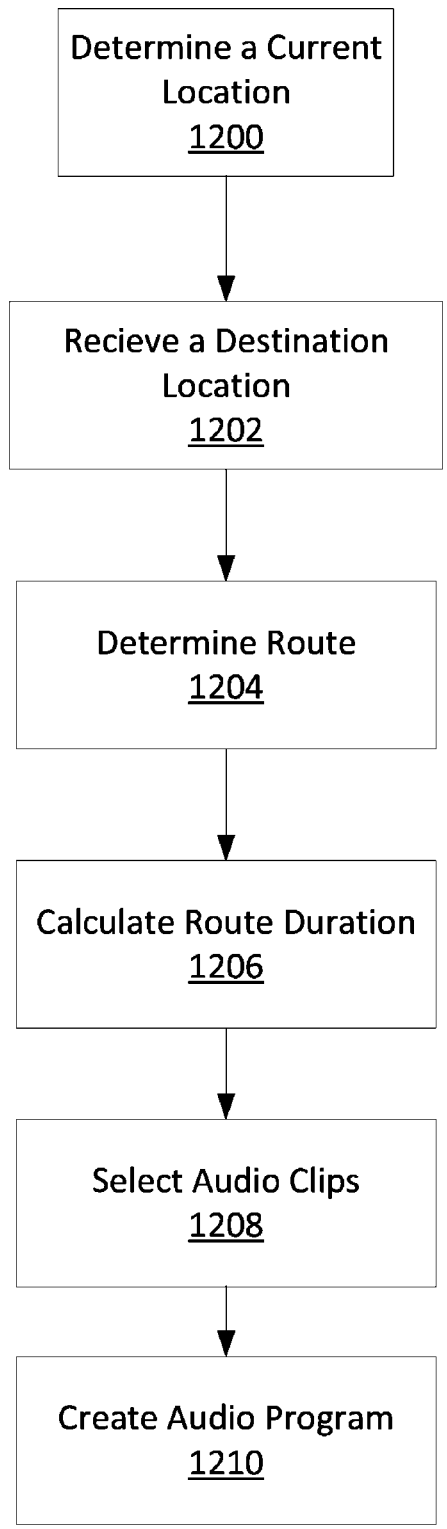
FIG. 12 illustrates a method of creating an audio program according to examples of the disclosure.

A music application can include a seek mode as illustrated in FIG. 11. A seek mode can allow a user to have some choice in music to play without having to navigate through an extensive music collection. The electronic device can generate a plurality of playlists based on the user's previous listening habits and songs frequently listened to. Each playlist can be associated with a name, such as a genre of the playlist. When seek mode is activated, a user interface 1100 such as illustrated in FIG. 11 may be displayed. A user interface object (e.g., objects 1104-1112) associated with each of the playlists may be displayed across the screen. A user interface object may be album art associated with a song from the playlist, for example. The electronic device may play a set duration (such as 20 seconds) excerpt of a song from each of the playlists. While an excerpt is playing, the name 1102 associated with the playlist may be displayed, and the user interface object 1104 associated with the playlist may be highlighted and/or displayed larger, for example. As the seek mode cycles through each of the playlist excerpts, the user may select a playlist to listen to and the electronic device can begin playing that playlist. Playlists may be dynamically generated and may continue indefinitely, adding additional songs as necessary.

An electronic device, as described herein, may comprise multiple electronic devices connected by wireline or wirelessly and/or in communication with each other. For example, a first electronic device may be embedded in a dashboard of an automobile, and a second electronic device may be a portable electronic device. The first and second electronic devices may be in communication wirelessly or by wireline, and one or both of the devices may perform the methods described herein. In some examples, some or all of a method may be performed on the second electronic device, and the user interfaces generated by the method may be displayed on a display of the first electronic device.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 13:
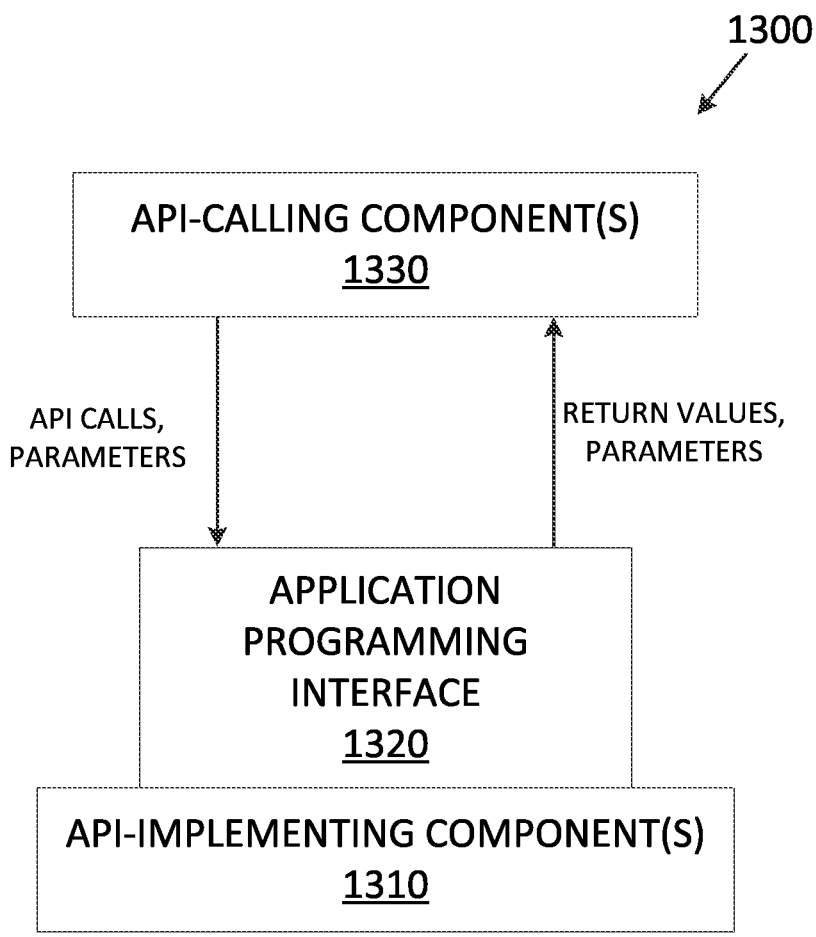
FIG. 13 is a block diagram illustrating an exemplary API architecture, which may be used in some examples of the disclosure.

FIG. 13 is a block diagram illustrating an exemplary API architecture, which may be used in some examples of the disclosure. As shown in FIG. 13, the API architecture 1300 includes the API-implementing component 1310 (e.g., an operating system, a library, a device driver, an API, an application program, software or other module) that implements the API 1320. The API 1320 specifies one or more functions, methods, classes, objects, protocols, data structures, formats and/or other features of the API-implementing component that may be used by the API-calling component 1330. The API 1320 can specify at least one calling convention that specifies how a function in the API-implementing component receives parameters from the API-calling component and how the function returns a result to the API-calling component. The API-calling component 1330 (e.g., an operating system, a library, a device driver, an API, an application program, software or other module), makes API calls through the API 1320 to access and use the features of the API-implementing component 1310 that are specified by the API 1320. The API-implementing component 1310 may return a value through the API 1320 to the API-calling component 1330 in response to an API call.

It will be appreciated that the API-implementing component 1310 may include additional functions, methods, classes, data structures, and/or other features that are not specified through the API 1320 and are not available to the API-calling component 1330. It should be understood that the API-calling component 1330 may be on the same system as the API-implementing component 1310 or may be located remotely and accesses the API-implementing component 1310 using the API 1320 over a network. While FIG. 13 illustrates a single API-calling component 1330 interacting with the API 1320, it should be understood that other API-calling components, which may be written in different languages (or the same language) than the API-calling component 1330, may use the API 1320.

The API-implementing component 1310, the API 1320, and the API-calling component 1330 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 14:
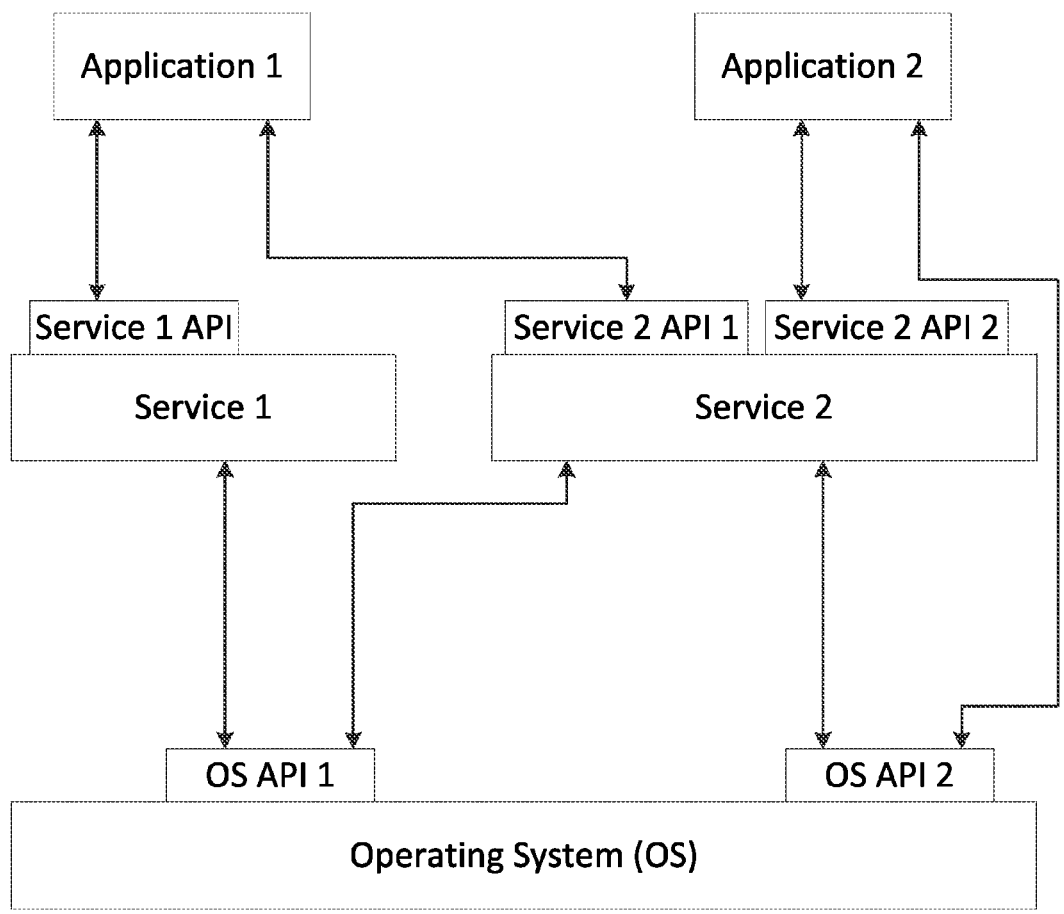
FIG. 14 illustrates an exemplary software stack of an API according to examples of the disclosure.

In the exemplary software stack shown in FIG. 14, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 15:
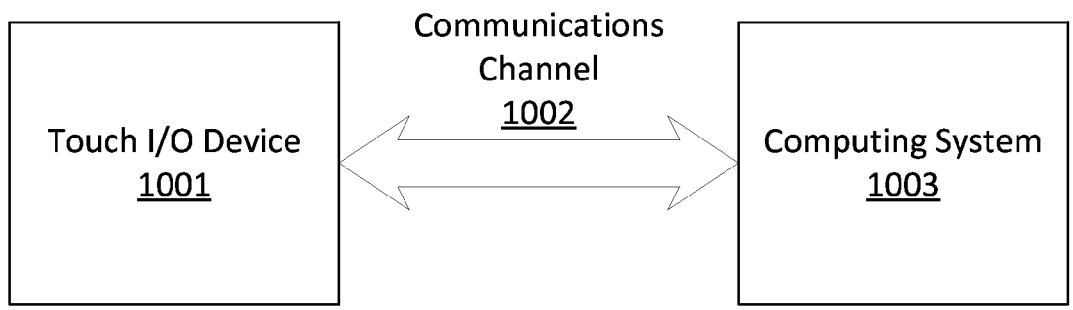
FIG. 15 is a block diagram illustrating exemplary interactions between the touch screen and other components of the device according to examples of the disclosure.

FIG. 15 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 16:
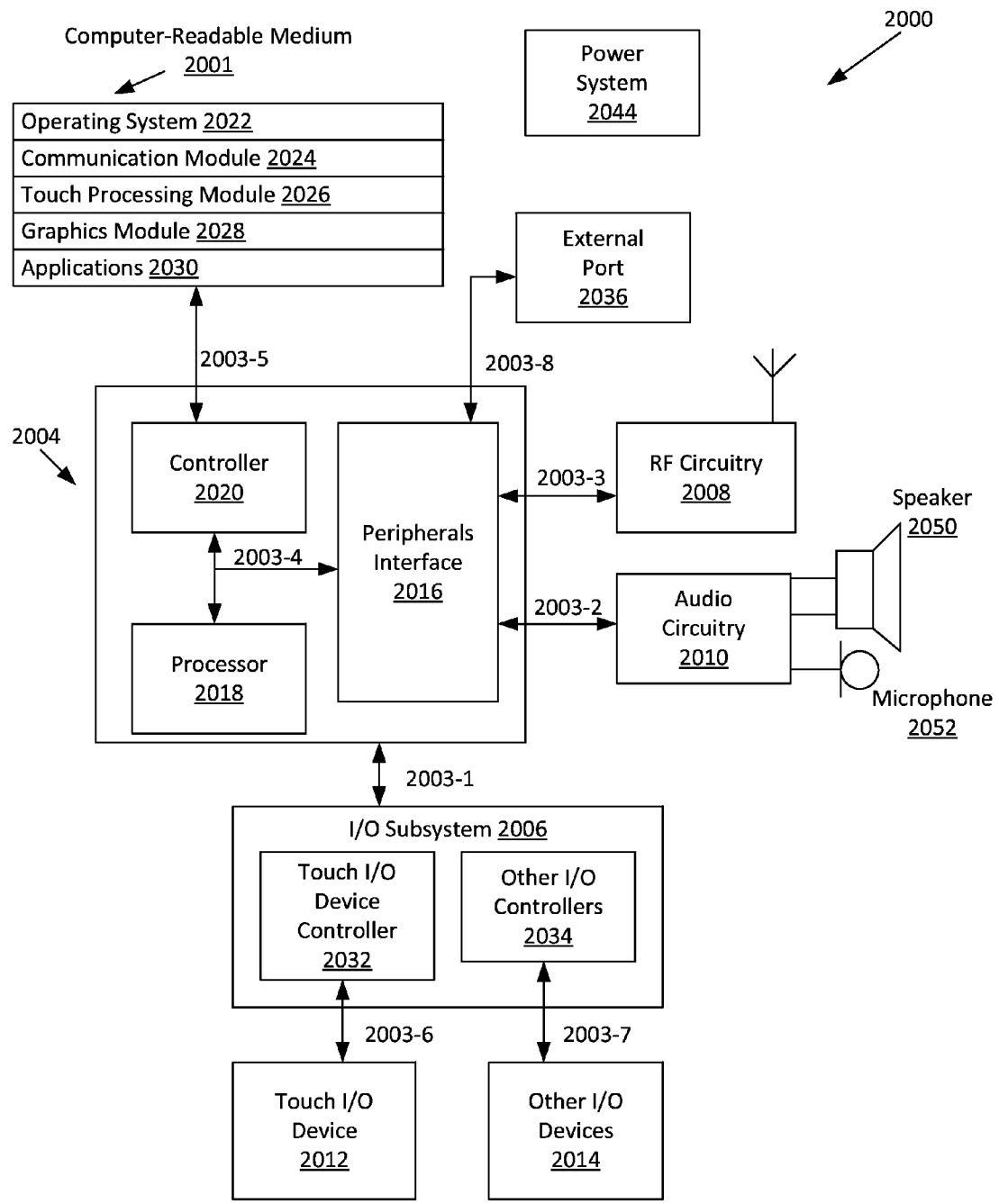
FIG. 16 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 16 is a block diagram of one example of system 2000 that generally includes one or more computer-readable mediums 2001, processing system 2004, I/O subsystem 2006, radio frequency (RF) circuitry 2008, audio circuitry 2010, and gaze detection circuitry 2011. These components may be coupled by one or more communication buses or signal lines 2003.

It should be apparent that the architecture shown in FIG. 16 is only one example architecture of system 2000, and that system 2000 could have more or fewer components than shown, or a different configuration of components. The various components shown in FIG. 16 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, and one or more applications (or set of instructions) 2030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensing display (e.g., touch screen), graphics module 2028 includes components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch sensing surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Figure 17:
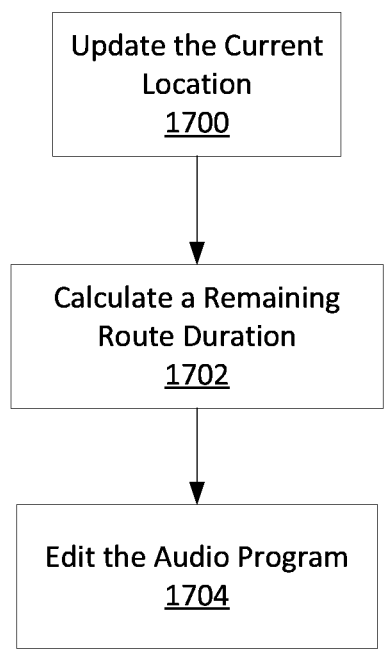
FIG. 17 illustrates a method of editing an audio program according to examples of the disclosure.

FIG. 17 illustrates a method of editing an audio program according to examples of the disclosure.

Figure 18:
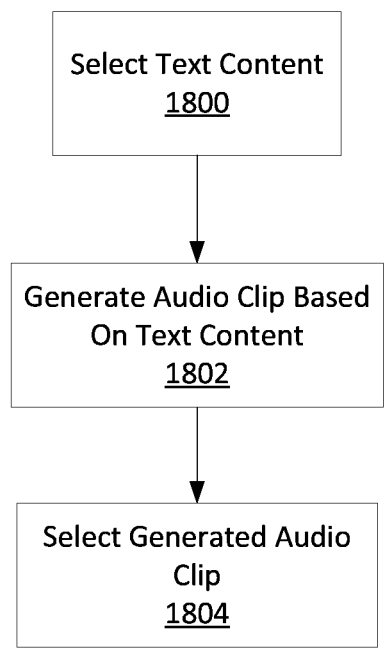
FIG. 18 illustrates a method of generating an audio clip from text content according to examples of the disclosure.

FIG. 18 illustrates a method of generating an audio clip from text content according to examples of the disclosure.

Figure 19:
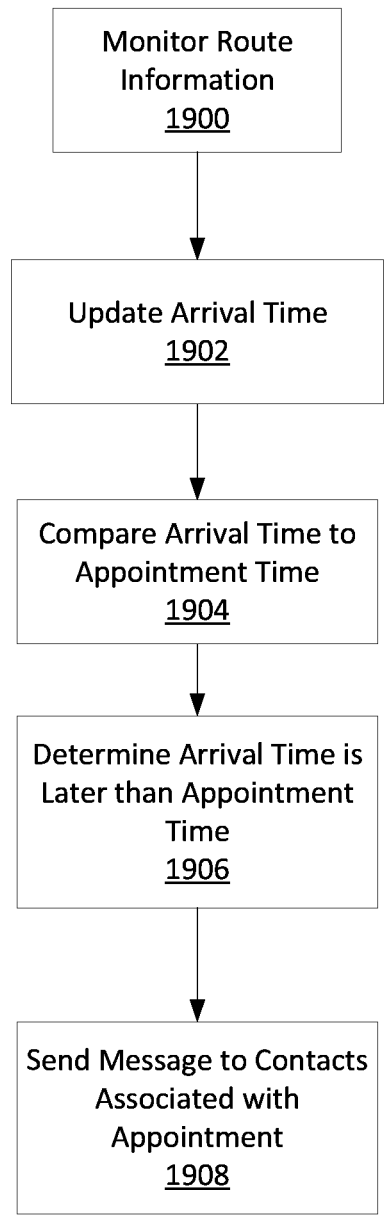
FIG. 19 illustrates a method of sending a message to contacts associated with an appointment according to examples of the disclosure.

FIG. 19 illustrates a method of sending a message to contacts associated with an appointment according to examples of the disclosure.

Figure 20:
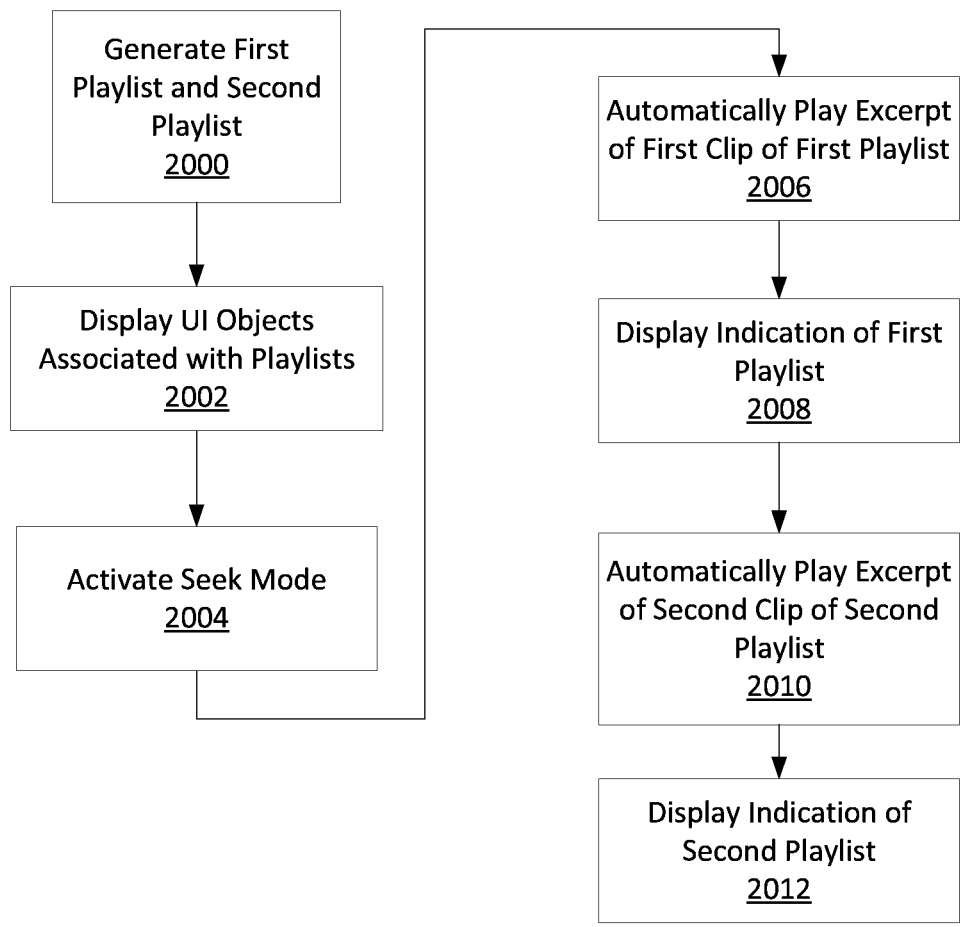
FIG. 20 illustrates a method of activating a seek mode according to examples of the disclosure.

FIG. 20 illustrates a method of activating a seek mode according to examples of the disclosure.

Figure 21:
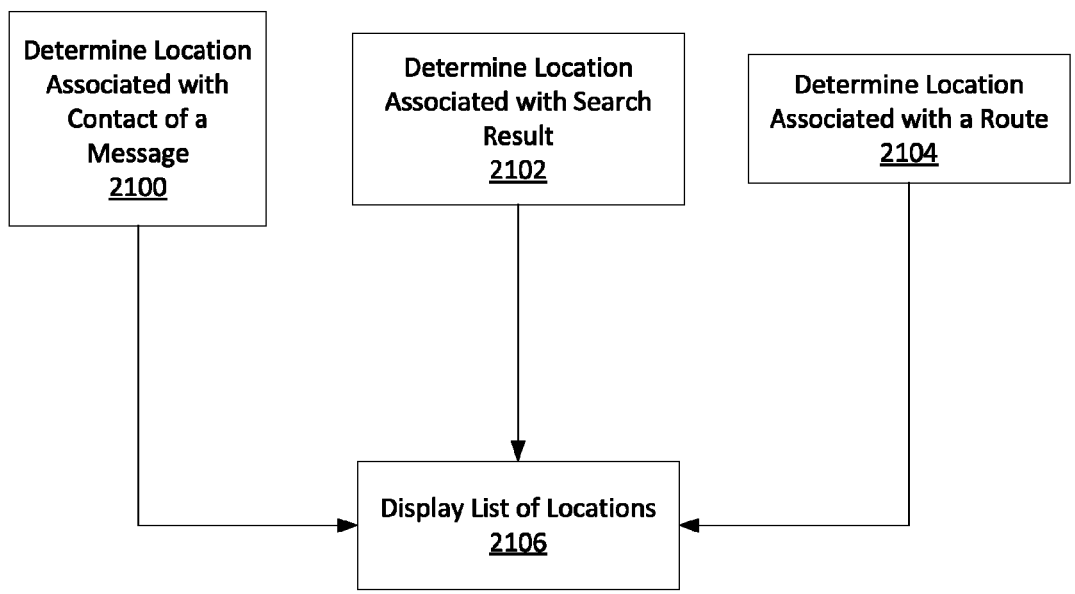
FIG. 21 illustrates a method of generating and displaying a list of recent locations according to examples of the disclosure.

FIG. 21 illustrates a method of generating and displaying a list of recent locations according to examples of the disclosure.

Figure 22:
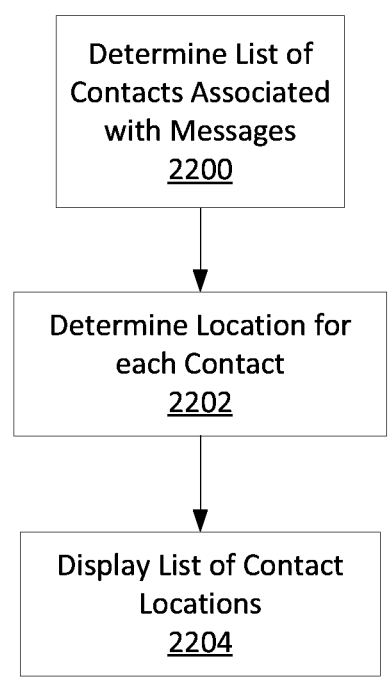
FIG. 22 illustrates a method of generating and displaying a list of recent locations according to examples of the disclosure.

FIG. 22 illustrates a method of generating and displaying a list of recent locations according to examples of the disclosure.

Figure 23:
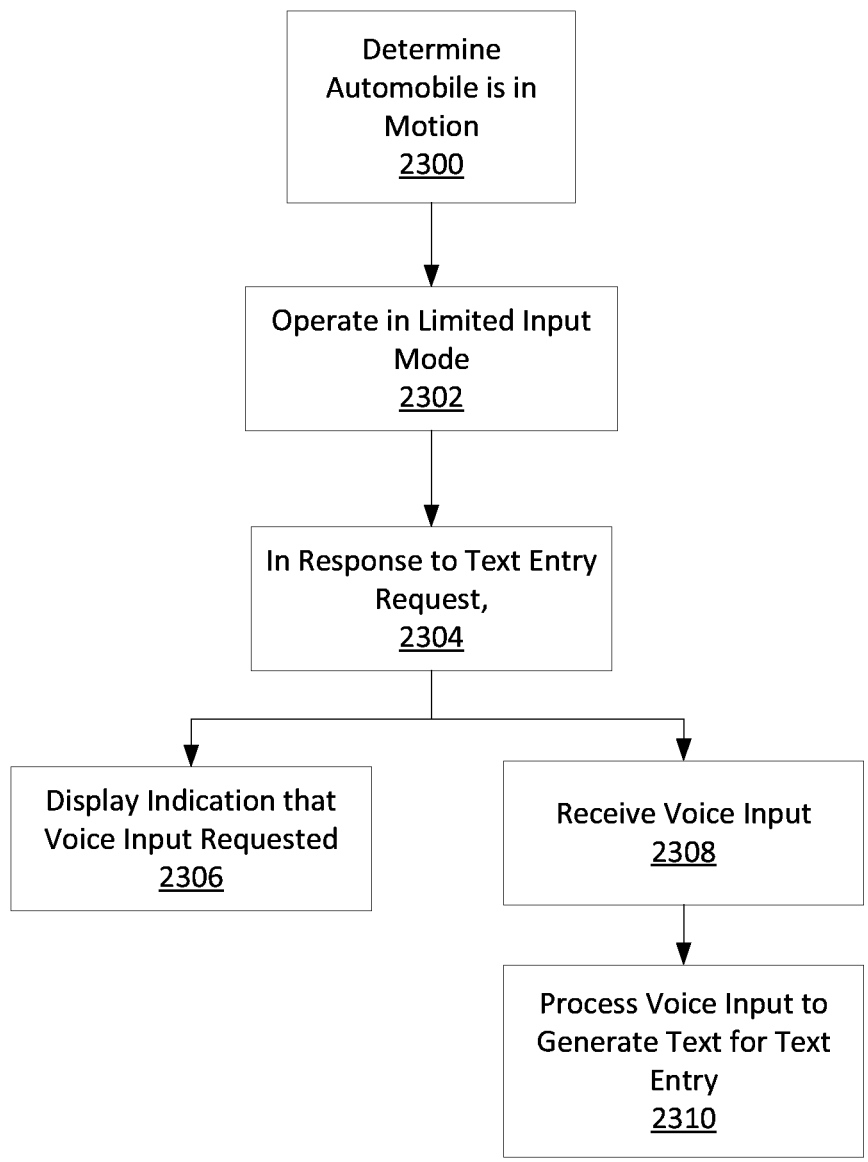
FIG. 23 illustrates a method of operating in a limited input mode according to examples of the disclosure.

FIG. 23 illustrates a method of operating in a limited input mode according to examples of the disclosure.

Examples of the disclosure can be advantageous in allowing for hands-free use of an electronic device, making use of the electronic device in an automobile, for example, easier, more intuitive, and safer.

Therefore, according to the above, this disclosure includes subject matter directed to the following examples:

Example 1

A computer-implemented method, comprising: determining a current location; receiving a destination location; determining a route from the current location to the destination location; calculating a route duration based on the route; selecting a plurality of audio clips based on a comparison of the combined duration of the audio clips and the route duration; and creating an audio program based on the selected plurality of audio clips.

Example 2

The method of preceding example 1, wherein the current location is determined based on at least one of GPS, correlations from known access points, radio tower triangulation, and cell tower triangulation.

Example 3

The method of any of preceding examples 1 and 2, further comprising: updating the current location; calculating a remaining route duration from the updated current location; and editing the audio program based on a comparison of the remaining duration of the audio program and the remaining route duration.

Example 4

The method of any of preceding examples 1-3, wherein updating the current location includes a determining a new location.

Example 5

The method of any of preceding examples 1-4, wherein selecting the plurality of audio clips further comprises: selecting text content; generating an audio clip based on the text content; and selecting the generated audio clip.

Example 6

The method of any of preceding examples 1-5, further comprising: monitoring route information, including one or both of traffic information and a current location; updating an arrival time based on the route information; comparing the updated arrival time to an appointment time associated with an appointment; based on the comparison, determining that the arrival time is later than the appointment time; and sending a message to one or more contacts associated with the appointment.

Example 7

The method of any of preceding examples 1-6, wherein the route information is monitored periodically.

Example 8

The method of any of preceding examples 1-7, further comprising: calculating a difference between the arrival time and the appointment time, wherein the text of the message includes the difference between the arrival time and the appointment time.

Example 9

The method of any of preceding examples 1-8, further comprising: generating a first playlist and a second playlist, each associated with a plurality of audio clips; displaying a first user interface object associated with the first playlist and a second user interface object associated with the second playlist; and in response to activation of a seek mode: automatically playing an excerpt of a first audio clip of the first playlist; displaying an indication of the first playlist while the first audio clip is playing; after playing the excerpt of the first audio clip, automatically playing an excerpt of a second audio clip of the second playlist; and displaying an indication of the second playlist while the second audio clip is playing.

Example 10

The method of any of preceding examples 1-9, further comprising: determining a first location associated with a contact of a message in a messaging application; determining a second location associated with a search result in a web browsing application; determining a third location associated with a route in a navigating application; and displaying a list of recent locations comprising a user interface object for each of the first, second, and third locations.

Example 11

The method of any of preceding examples 1-10, further comprising: determining a list of contacts associated with one or more messages received; determining a location for each of the contacts in the list of contacts; and displaying one or more of the locations in a list of recent locations.

Example 12

The method of any of preceding examples 1-11, further comprising: determining that an automobile is in motion; and based on the determination that the automobile is in motion, operating in a limited input mode, wherein operating in the limited input mode comprises: in response to an operation requesting text entry, displaying an indication that voice input is requested and receiving voice input from a user; and processing the voice input to generate text for the requested text entry.

Example 13

A non-transitory computer readable medium, the computer readable medium containing instructions that, when executed, perform the method of preceding example 1.

Example 14

A non-transitory computer readable medium, the computer readable medium containing instructions that, when executed, perform the method of preceding example 2.

Example 15

A non-transitory computer readable medium, the computer readable medium containing instructions that, when executed, perform the method of preceding example 3.

Example 16

A non-transitory computer readable medium, the computer readable medium containing instructions that, when executed, perform the method of preceding example 4.

Example 17

A non-transitory computer readable medium, the computer readable medium containing instructions that, when executed, perform the method of preceding example 5.

Example 18

A non-transitory computer readable medium, the computer readable medium containing instructions that, when executed, perform the method of preceding example 6.

Example 19

A non-transitory computer readable medium, the computer readable medium containing instructions that, when executed, perform the method of preceding example 7.

Example 20

A non-transitory computer readable medium, the computer readable medium containing instructions that, when executed, perform the method of preceding example 8.

Example 21

A non-transitory computer readable medium, the computer readable medium containing instructions that, when executed, perform the method of preceding example 9.

Example 22

A non-transitory computer readable medium, the computer readable medium containing instructions that, when executed, perform the method of preceding example 10.

Example 23

A non-transitory computer readable medium, the computer readable medium containing instructions that, when executed, perform the method of preceding example 11.

Example 24

A non-transitory computer readable medium, the computer readable medium containing instructions that, when executed, perform the method of preceding example 12.

Example 25

An electronic device, comprising: a processor to execute instructions; and a memory coupled with the processor to store instructions, which when executed by the processor, cause the processor to perform operations to generate an application programming interface (API) that allows an API-calling component to perform the method of preceding example 1.

Example 26

An electronic device, comprising: a processor to execute instructions; and a memory coupled with the processor to store instructions, which when executed by the processor, cause the processor to perform operations to generate an application programming interface (API) that allows an API-calling component to perform the method of preceding example 2.

Example 27

An electronic device, comprising: a processor to execute instructions; and a memory coupled with the processor to store instructions, which when executed by the processor, cause the processor to perform operations to generate an application programming interface (API) that allows an API-calling component to perform the method of preceding example 3.

Example 28

An electronic device, comprising: a processor to execute instructions; and a memory coupled with the processor to store instructions, which when executed by the processor, cause the processor to perform operations to generate an application programming interface (API) that allows an API-calling component to perform the method of preceding example 4.

Example 29

An electronic device, comprising: a processor to execute instructions; and a memory coupled with the processor to store instructions, which when executed by the processor, cause the processor to perform operations to generate an application programming interface (API) that allows an API-calling component to perform the method of preceding example 5.

Example 30

An electronic device, comprising: a processor to execute instructions; and a memory coupled with the processor to store instructions, which when executed by the processor, cause the processor to perform operations to generate an application programming interface (API) that allows an API-calling component to perform the method of preceding example 6.

Example 31

An electronic device, comprising: a processor to execute instructions; and a memory coupled with the processor to store instructions, which when executed by the processor, cause the processor to perform operations to generate an application programming interface (API) that allows an API-calling component to perform the method of preceding example 7.

Example 32

An electronic device, comprising: a processor to execute instructions; and a memory coupled with the processor to store instructions, which when executed by the processor, cause the processor to perform operations to generate an application programming interface (API) that allows an API-calling component to perform the method of preceding example 8.

Example 33

An electronic device, comprising: a processor to execute instructions; and a memory coupled with the processor to store instructions, which when executed by the processor, cause the processor to perform operations to generate an application programming interface (API) that allows an API-calling component to perform the method of preceding example 9.

Example 34

An electronic device, comprising: a processor to execute instructions; and a memory coupled with the processor to store instructions, which when executed by the processor, cause the processor to perform operations to generate an application programming interface (API) that allows an API-calling component to perform the method of preceding example 10.

Example 35

An electronic device, comprising: a processor to execute instructions; and a memory coupled with the processor to store instructions, which when executed by the processor, cause the processor to perform operations to generate an application programming interface (API) that allows an API-calling component to perform the method of preceding example 11.

Example 36

An electronic device, comprising: a processor to execute instructions; and a memory coupled with the processor to store instructions, which when executed by the processor, cause the processor to perform operations to generate an application programming interface (API) that allows an API-calling component to perform the method of preceding example 12.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:
1. A computer-implemented method, comprising:
at an electronic device including one or more processors and a memory:
determining a current location;
receiving a destination location;
determining a route from the current location to the destination location;
determining an estimated route duration for the route from the current location to the destination location;
before arriving at the destination location, creating an audio program, including selecting a plurality of audio clips for inclusion in the audio program, such that the audio program has a duration that is determined based on the estimated route duration, wherein the estimated route duration is an estimated amount of time that it will take to travel from the current location to the destination location; and
while travelling to the destination location along the route and before arriving at the destination location, playing the audio program.
2. The method of claim 1, wherein the current location is determined based on at least one of GPS, correlations from known access points, radio tower triangulation, and cell tower triangulation.

3. The method of claim 1, further comprising:
before arriving at the destination location:
updating the current location;
determining an estimated remaining route duration from the updated current location wherein the estimated remaining route duration is an estimated amount of time that it will take to travel from the updated current location to the destination location; and
editing the audio program such that the remaining audio program has a duration based on the estimated remaining route duration.
4. The method of claim 3, wherein updating the current location includes determining a new location.
5. The method of claim 1, wherein selecting the plurality of audio clips further comprises:
selecting text content;
generating an audio clip based on the text content; and
selecting the generated audio clip.
6. The method of claim 1, further comprising:
monitoring route information, including one or both of traffic information and a current location;
updating an arrival time based on the route information;
comparing the updated arrival time to an appointment time associated with an appointment;
based on the comparison, determining that the arrival time is later than the appointment time; and
sending a message to one or more contacts associated with the appointment.
7. The method of claim 6, wherein the route information is monitored periodically.
8. The method claim 6, further comprising:
calculating a difference between the arrival time and the appointment time, wherein the text of the message includes the difference between the arrival time and the appointment time.
9. The method of claim 1, further comprising:
generating a first playlist and a second playlist, each associated with a plurality of audio clips;
displaying a first user interface object associated with the first playlist and a second user interface object associated with the second playlist; and
in response to activation of a seek mode:
automatically playing an excerpt of a first audio clip of the first playlist;
displaying an indication of the first playlist while the first audio clip is playing;
after playing the excerpt of the first audio clip, automatically playing an excerpt of a second audio clip of the second playlist; and
displaying an indication of the second playlist while the second audio clip is playing.
10. The method of claim 1, further comprising:
determining a first location associated with a contact of a message in a messaging application;
determining a second location associated with a search result in a web browsing application;
determining a third location associated with a route in a navigating application; and
displaying a list of recent locations comprising a user interface object for each of the first, second, and third locations.

11. The method of claim 1, further comprising:
determining a list of contacts associated with one or more messages received;
determining a location for each of the contacts in the list of contacts; and
displaying one or more of the locations in a list of recent locations.

12. The method of claim 1, further comprising:
determining that an automobile is in motion; and
based on the determination that the automobile is in motion, operating in a limited input mode, wherein operating in the limited input mode comprises:
in response to an operation requesting text entry, displaying an indication that voice input is requested and receiving voice input from a user; and
processing the voice input to generate text for the requested text entry.

13. An electronic device, comprising:
one or more processors;
memory; and
one or more programs, wherein the one or more programs are stored in the memory and configured to be executed by the one or more processors, the one or more programs including instructions for:
determining a current location;
receiving a destination location;
determining a route from the current location to the destination location;
determining an estimated route duration for the route from the current location to the destination location;
before arriving at the destination location, creating an audio program, including selecting a plurality of audio clips for inclusion in the audio program, such that the audio program has a duration that is determined based on the estimated route duration, wherein the estimated route duration is an estimated amount of time that it will take to travel from the current location to the destination location; and
while travelling to the destination location along the route and before arriving at the destination location, playing the audio program.

14. The electronic device of claim 13, the one or more programs further including instructions for:
before arriving at the destination location:
updating the current location;
determining an estimated remaining route duration from the updated current location wherein the estimated remaining route duration is an estimated amount of time that it will take to travel from the updated current location to the destination location; and
editing the audio program such that the remaining audio program has a duration based on the estimated remaining route duration.

15. The electronic device of claim 13, wherein selecting the plurality of audio clips further comprises:
selecting text content;
generating an audio clip based on the text content; and
selecting the generated audio clip.

16. The electronic device of claim 13, the one or more programs further including instructions for:
monitoring route information, including one or both of traffic information and a current location;
updating an arrival time based on the route information;
comparing the updated arrival time to an appointment time associated with an appointment;
based on the comparison, determining that the arrival time is later than the appointment time; and
sending a message to one or more contacts associated with the appointment.

17. The electronic device of claim 16, the one or more programs further including instructions for:
calculating a difference between the arrival time and the appointment time, wherein the text of the message includes the difference between the arrival time and the appointment time.

18. The electronic device of claim 13, the one or more programs further including instructions for:
generating a first playlist and a second playlist, each associated with a plurality of audio clips;
displaying a first user interface object associated with the first playlist and a second user interface object associated with the second playlist; and
in response to activation of a seek mode:
automatically playing an excerpt of a first audio clip of the first playlist;
displaying an indication of the first playlist while the first audio clip is playing;
after playing the excerpt of the first audio clip, automatically playing an excerpt of a second audio clip of the second playlist; and
displaying an indication of the second playlist while the second audio clip is playing.

19. The electronic device of claim 13, the one or more programs further including instructions for:
determining a first location associated with a contact of a message in a messaging application;
determining a second location associated with a search result in a web browsing application;
determining a third location associated with a route in a navigating application; and
displaying a list of recent locations comprising a user interface object for each of the first, second, and third locations.

20. The electronic device of claim 13, the one or more programs further including instructions for:
determining a list of contacts associated with one or more messages received;
determining a location for each of the contacts in the list of contacts; and
displaying one or more of the locations in a list of recent locations.

21. A non-transitory computer readable storage medium storing one or more programs, the one or more programs comprising instructions, which when executed by an electronic device, cause the device to perform a method comprising:
determining a current location;
receiving a destination location;
determining a route from the current location to the destination location;
determining an estimated route duration for the route from the current location to the destination location;
before arriving at the destination location, creating an audio program, including selecting a plurality of audio clips for inclusion in the audio program, such that the audio program has a duration that is determined based on the estimated route duration, wherein the estimated route duration is an estimated amount of time that it will take to travel from the current location to the destination location; and while travelling to the destination location along the route, playing the audio program and before arriving at the destination location.

22. The non-transitory computer readable storage medium of claim 21, the method further comprising:
before arriving at the destination location:
updating the current location;
determining an estimated remaining route duration from the updated current location wherein the estimated remaining route duration is an estimated amount of time that it will take to travel from the updated current location to the destination location; and
editing the audio program such that the remaining audio program has a duration based on the estimated remaining route duration.

23. The non-transitory computer readable storage medium of claim 21, wherein selecting the plurality of audio clips further comprises:
selecting text content;
generating an audio clip based on the text content; and
selecting the generated audio clip.

24. The non-transitory computer readable storage medium of claim 21, the method further comprising:
monitoring route information, including one or both of traffic information and a current location;
updating an arrival time based on the route information;
comparing the updated arrival time to an appointment time associated with an appointment;
based on the comparison, determining that the arrival time is later than the appointment time; and
sending a message to one or more contacts associated with the appointment.

25. The non-transitory computer readable storage medium claim 24, the method further comprising:
calculating a difference between the arrival time and the appointment time, wherein the text of the message includes the difference between the arrival time and the appointment time.

26. The non-transitory computer readable storage medium of claim 21, the method further comprising:
generating a first playlist and a second playlist, each associated with a plurality of audio clips;
displaying a first user interface object associated with the first playlist and a second user interface object associated with the second playlist; and
in response to activation of a seek mode:
automatically playing an excerpt of a first audio clip of the first playlist;
displaying an indication of the first playlist while the first audio clip is playing;
after playing the excerpt of the first audio clip, automatically playing an excerpt of a second audio clip of the second playlist; and
displaying an indication of the second playlist while the second audio clip is playing.

27. The non-transitory computer readable storage medium of claim 21, the method further comprising:
determining a first location associated with a contact of a message in a messaging application;
determining a second location associated with a search result in a web browsing application;
determining a third location associated with a route in a navigating application; and
displaying a list of recent locations comprising a user interface object for each of the first, second, and third locations.

28. The non-transitory computer readable storage medium of claim 21, the method further comprising:
determining a list of contacts associated with one or more messages received;
determining a location for each of the contacts in the list of contacts; and
displaying one or more of the locations in a list of recent locations.

29. The method of claim 1, wherein selecting the plurality of audio clips for inclusion in the audio program further comprises selecting the plurality of audio clips for inclusion in the audio program, such that the audio program has a total duration within a threshold time of the estimated route duration.

30. The method of claim 1, further comprising:
while playing a first audio clip included in the audio program, receiving user input to change a current play position in the audio program; and
in response to receiving the user input to change the current play position in the audio program:
changing the current play position in the audio program; and
updating the audio program, including adding one or more audio clips to the audio program or removing one or more audio clips from the audio program, such that the audio program has a remaining duration that is based on an estimated remaining route duration for the route when the current play position was changed, wherein the estimated remaining route duration is an estimated amount of time that it will take to travel from a location at which the current play position was changed to the destination location.

31. The method of claim 1, wherein the duration of the audio program is equal to a sum of durations of the plurality of audio clips included in the audio program.

32. The electronic device of claim 13, wherein selecting the plurality of audio clips for inclusion in the audio program further comprises selecting the plurality of audio clips for inclusion in the audio program, such that the audio program has a total duration within a threshold time of the estimated route duration.

33. The electronic device of claim 13, the one or more programs further including instructions for:
while playing a first audio clip included in the audio program, receiving user input to change a current play position in the audio program; and
in response to receiving the user input to change the current play position in the audio program:
changing the current play position in the audio program; and
updating the audio program, including adding one or more audio clips to the audio program or removing one or more audio clips from the audio program, such that the audio program has a remaining duration that is based on an estimated remaining route duration for the route when the current play position was changed, wherein the estimated remaining route duration is an estimated amount of time that it will take to travel from a location at which the current play position was changed to the destination location.

34. The electronic device of claim 13, wherein the duration of the audio program is equal to a sum of durations of the plurality of audio clips included in the audio program.

35. The non-transitory computer readable storage medium of claim 21, wherein selecting the plurality of audio clips for inclusion in the audio program further comprises selecting the plurality of audio clips for inclusion in the audio program, such that the audio program has a total duration within a threshold time of the estimated route duration.

36. The non-transitory computer readable storage medium of claim 21, the method further comprising:
- while playing a first audio clip included in the audio program, receiving user input to change a current play position in the audio program; and
- in response to receiving the user input to change the current play position in the audio program:
  - changing the current play position in the audio program; and
  - updating the audio program, including adding one or more audio clips to the audio program or removing one or more audio clips from the audio program, such that the audio program has a remaining duration that is based on an estimated remaining route duration for the route when the current play position was changed, wherein the estimated remaining route duration is an estimated amount of time that it will take to travel from a location at which the current play position was changed to the destination location.

37. The non-transitory computer readable storage medium of claim 21, wherein the duration of the audio program is equal to a sum of durations of the plurality of audio clips included in the audio program.

* * * * *